UNITED STATES PATENT OFFICE.

ISAAC ADAMS, JR., OF BOSTON, MASSACHUSETTS.

IMPROVED MODE OF ELECTROPLATING WITH NICKEL.

Specification forming part of Letters Patent No. 90,332, dated May 25, 1869.

*To all whom it may concern:*

Be it known that I, ISAAC ADAMS, Jr., of Boston, in the State of Massachusetts, have invented an Improvement in the Electro-Deposition of Nickel, of which the following is a specification:

This improvement consists in the use of a new solution from which to deposit nickel by the electric current, formed of sulphite of nickel dissolved in a solution of sulphite or bisulphite of ammonia. It may be used with special advantage where the nickel plate forming the anode in the solution contains zinc. Nearly all commercial nickel contains more or less zinc, the presence of which tends to increase the evolution of hydrogen on the deposited plate. There is less tendency to this evolution of hydrogen with this solution than with those heretofore described in the books which speak of the deposition of nickel.

I prepare this solution in the following manner: To a solution of sulphate of nickel, of such strength as to contain for each gallon not less than one ounce of metallic nickel, I add a solution of sulphite or bisulphite of ammonia, containing not less than three ounces of the salt for each ounce of metallic nickel in the solution of sulphate of nickel, to which it is added. The resulting products are sulphite of nickel and sulphite of ammonia, and a residuary product of sulphate of ammonia.

This solution may also be made from the nitrate, chloride, or acetate of nickel by adding the proper quantity of sulphite or bisulphite of ammonia; but with these salts the residuary product, as I have called it, will be, in each case, different. I prefer, however, the use of the sulphate of nickel for making the solution.

This solution is liable, on exposure to the air, to change into a sulphate solution, by taking up oxygen from the air, and this tendency must be counteracted by adding sulphite or bisulphite of ammonia to it from time to time.

What I claim as my invention is—

The use of a solution of sulphite of nickel in a solution of sulphite or bisulphite of ammonia for depositing nickel.

The above specification of my said invention signed and witnessed at Boston this 3d day of May, A. D. 1869.

ISAAC ADAMS, JR.

Witnesses:
 CHAUNCEY SMITH,
 WILLIAM W. SWAN.